United States Patent [19]

Smith

[11] 4,432,485
[45] Feb. 21, 1984

[54] CORRUTHERM EXPANSION FIXTURE

[75] Inventor: William E. Smith, Palm Beach County, Fla.

[73] Assignee: The United States of America as represented by the Secretary of the Air Force, Washington, D.C.

[21] Appl. No.: 304,122

[22] Filed: Sep. 21, 1981

[51] Int. Cl.³ .............................................. B23K 19/00
[52] U.S. Cl. .................................. 228/44.1 R; 138/38; 138/148
[58] Field of Search ................. 228/44.1, 44.5, 127, 228/243; 29/157.3 A, 157.3 AH; 428/36, 182, 186; 269/48.1; 138/148, 173, 38; 285/114; 279/2 R; 165/179, 183; 432/225

[56] References Cited

U.S. PATENT DOCUMENTS

| | | | |
|---|---|---|---|
| Re. 28,509 | 5/1973 | Piechocki et al. | 228/180 |
| 2,401,974 | 6/1946 | Siebels | 138/148 |
| 2,703,921 | 3/1955 | Brown | 165/179 |
| 2,726,681 | 12/1955 | Gaddis et al. | 138/38 |
| 2,756,032 | 7/1956 | Dowell | 428/182 X |
| 2,975,259 | 3/1961 | Osborn, Jr. | 219/9.5 |
| 3,002,729 | 10/1961 | Welsh | 165/179 |
| 3,200,848 | 8/1965 | Takagi | 138/38 |
| 3,831,247 | 8/1974 | Degroote | 228/215 |

Primary Examiner—Nicholas P. Godici
Assistant Examiner—M. Jordan
Attorney, Agent, or Firm—Donald J. Singer; John R. Flanagan

[57] ABSTRACT

A corrutherm expansion fixture is provided for supporting a part in a desired configuration during a brazing operation. The fixture includes a discontinuous corrugated ring formed from material which is expansible when subjected to high temperature. The fixture also includes a continuous inner ring and a discontinuous outer ring between which the corrugated ring is disposed. The inner ring resists inward movement of the corrugated ring when expansion force is exerted by the corrugated ring. The outer ring supports the part to be brazed and transmits the expansion force to the part to retain it in the desired configuration as the force is exerted on the outer ring by the corrugated ring.

9 Claims, 3 Drawing Figures

U.S. Patent     Feb. 21, 1984     4,432,485
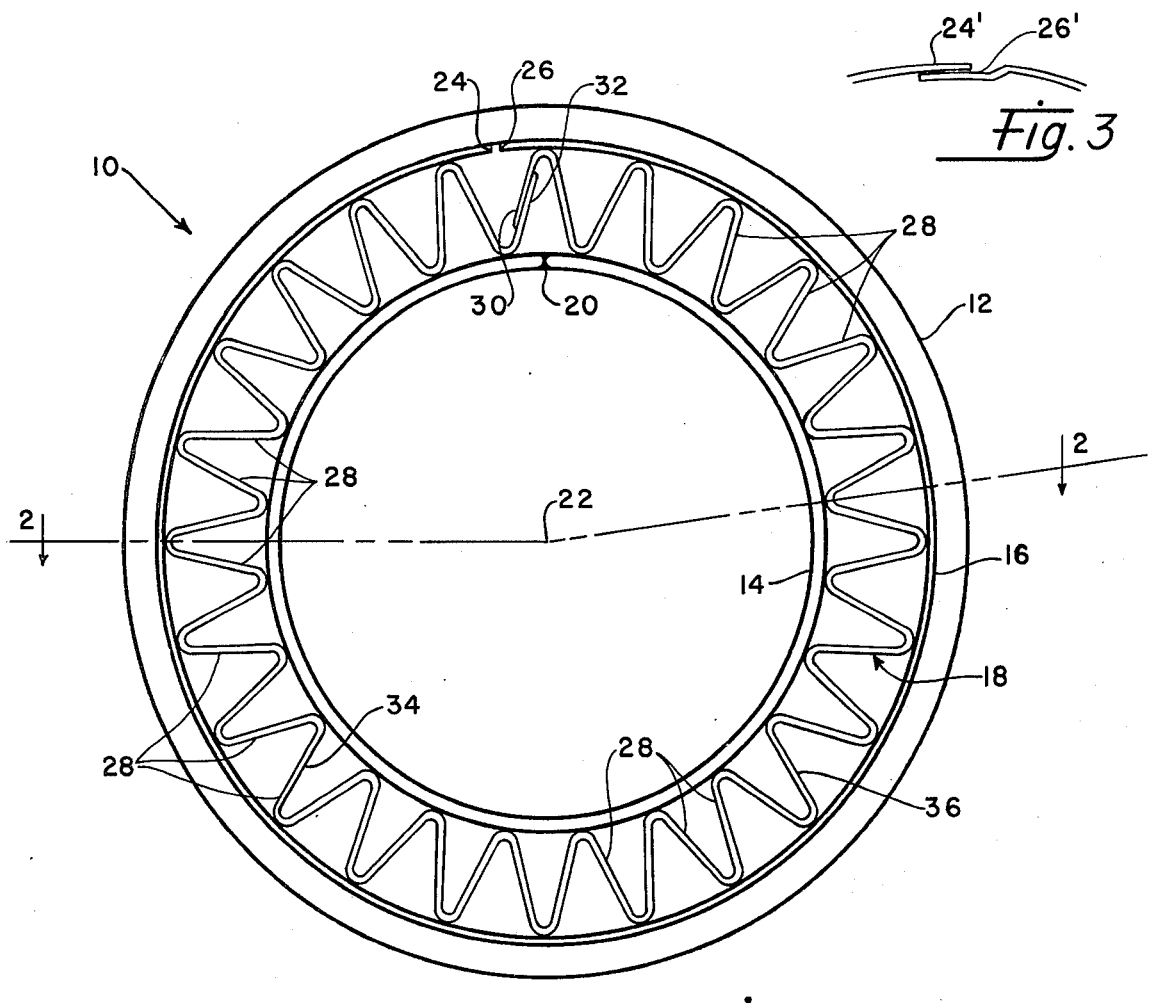
Fig. 3
Fig. 1
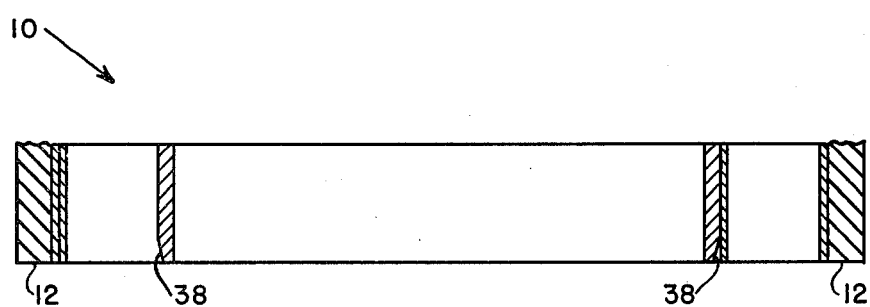
Fig. 2

CORRUTHERM EXPANSION FIXTURE

RIGHTS OF THE GOVERNMENT

The invention described herein may be manufactured and used by or for the Government of the United States for all governmental purposes without the payment of any royalty.

BACKGROUND OF THE INVENTION

1. Field of the Invention

The present invention broadly relates to high temperature fabrication of parts, such as by brazing or the like, and, more particularly, is concerned with a corrutherm expansion fixture for supporting a past during brazing thereof.

2. Description of the Prior Art

Generally, the term "brazing" is applied to that group of welding processes in which metal components are joined together by means of a nonferrous filler metal or alloy medium having a melting point above 800° F. but below that of the base metals or alloys of the components. In the brazing operation, the components are heated but not melted while the brazing medium is melted. The melted medium wets the surfaces of the components to be joined, creeps into and through each joint by capillary action, and adheres to the surfaces by alloying and diffusion bonding therewith.

Brazing processes are widely used in industry for the fabrication of parts from a variety of metals and alloys. Furnace brazing is particularly suited for fabrication of an assembly en masse wherein the joining of a multitude of parts is required. As the assembly is heated in the furnace, all joints in the assembly are completed at the same time regardless of their inaccessibility, shape, depth or number.

In furnace brazing of various assemblies, particularly those which are tubular or cylindrical shaped, it is conventional practice to use ring-shaped support fixtures and rely on the thermal expansion of the ring material for supporting the assembly during the brazing operation. However, in thermal expansion of the full ring, control of the expansion force required to support the assembly is regulated by changing the temperature of brazing operation or by selecting a ring material having a coefficient of thermal expansion properly matched to the materials which form the components of the assembly. The expansion force requirement will vary, depending upon the construction, configuration, and metal composition of the assembly or part to be brazed.

The present techniques of changing the brazing temperature or selecting a material of a particular coefficient of thermal expansion require that a complex analysis be performed for each individual assembly since the expansion force requirement for each assembly differs. It would be desirable to find a way to regulate the expansion force level in a manner simpler than that presently practiced. For instance, it would be advantageous to be able to evolve an expansion fixture design which has a more general purpose application than has been the case heretofore.

SUMMARY OF THE INVENTION

The present invention provides a corrutherm expansion fixture designed to satisfy the aforementioned needs. By using a corrugated ring as part of the expansion fixture, the thermal expansion force exerted against the assembly components being supported by the fixture can now be regulated merely by the simple technique of changing the thickness of the corrugated ring material from application to application. Neither the brazing temperature nor the fixture material needs to be changed. Therefore, the present invention obviates the necessity to perform a specific, complex analysis precedent to design of a support fixture for each assembly to be brazed.

Accordingly, the present invention is directed to a corrutherm expansion fixture for exerting thermal expansion force against components of an assembly that provides for equalization and control of the force so as to maintain the components of the assembly in their desired positional relationships to one another during a high temperature fabrication operation, such as by furnace brazing or the like. The fixture includes: (a) an inner ring; (b) an outer ring, and (c) a corrugated ring disposed between the inner and outer rings. The inner and outer rings are each cylindrical in shape and have a common axis. The corrugated ring includes a plurality of corrugations which extend parallel to the common longitudinal axis of the inner and outer rings. The corrugated ring is discontinuous, formed from material which is expansible when subjected to high temperature, and has opposite ends which are positioned adjacent to one another when the corrugated ring is disposed between the inner and outer rings. The inner ring is continuous and disposed within the corrugated ring. The inner ring resists inward movement of the corrugated ring when expansion force is exerted against the inner ring by the corrugated ring. The outer ring is discontinuous and disposed about the corrugated ring. The outer ring supports the components of the assembly and transmits expansion force thereto so as to retain the same in their desired configuration as the force is imposed on the outer ring by the corrugated ring.

BRIEF DESCRIPTION OF THE DRAWINGS

FIG. 1 is an end elevational view of the corrutherm expansion fixture embodying the principles of the present invention.

FIG. 2 is a cross-sectional view taken along line 2—2 of FIG. 1.

FIG. 3 is a fragmentary view of the positional relationship between the opposite ends of the outer ring in an alternative form to that shown in FIG. 1.

DETAILED DESCRIPTION OF THE INVENTION

Referring now to the drawings, and more particularly to FIGS. 1 and 2, there is shown the preferred embodiment of the corrutherm expansion fixture of the present invention, being generally designated 10. The fixture 10 is capable of retaining a component in a desired position or configuration during a high temperature fabricating operation, such as furnace brazing or the like. In FIG. 1, by way of example, the fixture is shown disposed adjacent a shroud seal ring 12 of a vane and case assembly (not shown) for a turbine engine. The fixture prevents distortion or deformation of the assembly during brazing of the parts of the assembly together.

Basically, the fixture 10 is comprised of three parts: an inner ring 14, an outer ring 16, and a corrugated ring 18 disposed between the inner and outer rings. One example of the material from which each of the rings may be constructed is 300 series stainless steel.

The inner ring 14 is of continuous or closed construction. For example, it may be formed by bending a rectangular sheet into a cylindrical shape by any suitable method and then connecting the opposite ends of the sheet together by a butt welded joint, such as seen at 20. By such construction, the inner ring 14 will resist the force generated by expansion of the metal of the corrugated ring 18 due to the high temperature of the brazing operation. Thus, the inner ring 14 will direct the expansion of the corrugated ring 18 in a generally outward radial direction from a central longitudinal axis 22 of the inner ring 14.

The outer ring 16 is of discontinuous or open construction. For example, it may be formed by bending a rectangular sheet into a cylindrical shape about longitudinal axis 22 by any suitable method where the opposite ends 24 and 26 of the sheet are positioned adjacent to one another but separated by a gap, such as seen in FIG. 1. An alternative arrangement is shown by FIG. 3 wherein ends 24' and 26' overlap one another. By such construction, the outer ring 16 is split and may expand diametrically when the expansion force of the corrugated ring is exerted on its during the brazing operation.

The corrugated ring is of discontinuous construction and has a plurality of corrugations 28 which extend parallel to the common longitudinal axis 22 of rings 14 and 16. The corrugated ring may be formed from a rectangular sheet. First, the corrugations 28 would be formed in the sheet and then the sheet formed into a cylindrical shape by any suitable method where the opposite ends 30 and 32 of the sheet overlap one another, as seen in FIG. 1. Alternatively, the corrugated ring may be formed by a plurality of corrugated ring segments wherein the overlapped ends 30 and 32 would also be duplicated at, for example, locations 34 and 36. In such case the ring 18 would be comprised by three ring segments.

It will be readily appreciated that, due to the continuous construction of the inner ring 14 and discontinuous construction of the outer and corrugated rings 16 and 18, the force of metal expansion, which derives primarily from the corrugated ring, is resisted by the inner ring 14 but accommodated by the outer ring 16 and corrugated ring 18. The latter are both diametrically expansible. By using the corrugated ring 18, the thermal expansion force exerted against the component 12 through the outer ring 16 can be regulated by changing the thickness of the corrugated ring material. Therefore, there is no need to change the brazing temperature or the type of ring material to regulate the force. Futhermore, due to the configuration of the corrugated ring 18, the expansion force exerted on the outer ring and therefrom on the part being supported will be distributed uniformly so as to better resist any distortion of the part and thereby retain the assembly in a desired configuration during the brazing operation.

The rings of the fixture 10 are assembled together, first, by placing the outer ring 16 on the component 12. Next, the corrugated ring 18 is placed within the outer ring 16. Finally, the inner ring 14 is placed within the corrugated ring 18. The slight chamfer on a marginal outer edge at 38 of the inner ring 14, as seen in FIG. 2, will facilitate insertion of the inner ring within the corrugated ring.

It is thought that the corrutherm expansion fixture of the present invention and many of its attendant advantages will be understood from the foregoing description and it will be apparent that various changes may be made in the form, construction and arrangements of the parts thereof without departing from the spirit and scope of the invention or sacrificing all of its material advantages, the form hereinbefore described being merely a preferred or exemplary embodiment thereof.

Having thus described the invention, what is claimed is:

1. A corrutherm expansion fixture, comprising:
   (a) an inner ring;
   (b) an outer ring; and
   (c) a corrugated ring loosely disposed between said inner and outer rings;
   (d) said outer ring being discontinuous and having opposite ends which are positioned adjacent to one another.

2. The expansion fixture as recited in claim 1, wherein:
   said inner and outer rings are each cylindrical in shape and have a common longitudinal axis; and
   said corrugated ring includes a plurality of corrugations which extend parallel to said common longitudinal axis of said inner and outer rings.

3. The expansion fixture as recited in claim 1, wherein said corrugated ring is discontinuous and has opposite ends which are positioned adjacent to one another when said corrugated ring is disposed between said inner and outer rings.

4. The expansion fixture as recited in claim 3, wherein said opposite ends of said corrugated ring overlap one another.

5. The expansion fixture as recited in claim 3, wherein said corrugated ring is formed by a plurality of corrugated ring segments.

6. The expansion fixture as recited in claim 1, wherein said opposite ends of said outer ring are separated by a gap.

7. The expansion fixture as recited in claim 1, wherein said opposite ends of said outer ring overlap one another.

8. The expansion fixture as recited in claim 1, wherein said inner ring is continuous.

9. A corrutherm expansion fixture for exerting thermal expansion force against a part for supporting the part in a desired configuration during a high temperature part fabricating operation, such as furnace brazing or the like, said expansion fixture comprising:
   (a) a discontinuous corrugated ring formed from material which is expansible when subjected to high temperatures;
   (b) a continuous inner ring disposed within said corrugated ring for resisting inward movement of said corrugated ring when expansion force is exerted against said inner ring by said corrugated ring; and
   (c) a discontinuous outer ring disposed about said corrugated ring and supporting said part, said outer ring for transmitting expansion force to said part to retain the same in said desired configuration as said force is imposed on said outer ring by said corrugated ring.

* * * * *